United States Patent [19]

Takada et al.

[11] Patent Number: 4,682,518
[45] Date of Patent: Jul. 28, 1987

[54] METHOD AND APPARATUS FOR CONTROLLING HYDRAULICALLY-OPERATED POWER TRANSMITTING SYSTEM INCLUDING CONTINUOUSLY VARIABLE TRANSMISSION

[75] Inventors: Mitsuru Takada; Hiroshi Itoh, both of Toyota; Shigeki Hiramatsu, Okazaki; Tadashi Tamura, Toyota, all of Japan

[73] Assignee: Toyota Jidosha Kabushiki Kaisha, Aichi, Japan

[21] Appl. No.: 789,709

[22] Filed: Oct. 21, 1985

[30] Foreign Application Priority Data

Oct. 24, 1984 [JP] Japan .................................. 59-221957
Nov. 2, 1984 [JP] Japan .................................. 59-230330

[51] Int. Cl.4 ........................................... B60K 41/16
[52] U.S. Cl. ........................................ 74/867; 74/689; 74/866; 74/877
[58] Field of Search ................ 74/865, 866, 867, 877, 74/689; 364/424.1

[56] References Cited

U.S. PATENT DOCUMENTS

| 4,329,888 | 5/1982 | Falzoni | 74/689 |
| 4,335,629 | 6/1982 | Falzoni | 74/689 |
| 4,392,394 | 7/1983 | Hofbauer et al. | 74/689 |
| 4,393,731 | 7/1983 | Groswhite et al. | 74/689 |

FOREIGN PATENT DOCUMENTS 60-37455 2/1985 Japan .................................. 74/689

Primary Examiner—Leslie A. Braun
Assistant Examiner—Dwight G. Diehl
Attorney, Agent, or Firm—Parkhurst & Oliff

[57] ABSTRACT

A method and an apparatus for controlling a hydraulically-operated power transmitting system for an automotive vehicle, the power transmitting system including a continuously variable transmission and an auxiliary transmission coupled to the continuously variable transmission, the auxiliary transmission having plural speed-range positions. A shifting operation of the continuously variable transmission is restrained while the auxiliary transmission is in a shifting action.

12 Claims, 20 Drawing Figures

FIG. 2

| SHIFT POSITIONS | | HIGH-RANGE CLUTCH 56 | LOW-RANGE BRAKE BAND 58 | REVERSE BRAKE BAND 60 | SPEED-RATIO OF AUX. TRANSMISSION |
|---|---|---|---|---|---|
| L (LOW) AND D (DRIVE) | LOW RANGE | × | ○ | × | $1 + \dfrac{\rho_1}{\rho_2}$ |
| | HIGH RANGE | ○ | × | × | 1 |
| N (NEUTRAL) | | × | × | × | — |
| R (REVERSE) | | × | × | ○ | $-\left(1 - \dfrac{1}{\rho_2}\right)$ |

METHOD AND APPARATUS FOR CONTROLLING HYDRAULICALLY-OPERATED POWER TRANSMITTING SYSTEM INCLUDING CONTINUOUSLY VARIABLE TRANSMISSION

BACKGROUND OF THE INVENTION

1. Field of the Art

The present invention relates to a method and an apparatus for controlling a hydraulically-operated power transmitting system used in an automotive vehicle, which system includes a continuously variable transmission (hereinafter referred to as "CVT").

2. Related Art Statement

A power transmitting system for a vehicle including a CVT is provided with an auxiliary transmission for widening a range of a speed ratio of the CVT and thereby improving the drivability of the vehicle. For example, a power transmitting system is disclosed in Japanese patent application No. 59-123620 (laid-open under Publication Nos. 61-2957 on Jan. 8, 1986) and 59-149569 (laid-open under Publication No. 61-31752 on Feb. 14, 1986). In such a transmitting system, a speed ratio "r" of the CVT ($N_{in}/N_{out}$, where $N_{in}$: input speed $N_{in}$ of an input shaft of the CVT, and Nout: output speed of an output shaft of the CVT) is controlled so that the input speed $N_{in}$ coincides with a target input speed $N_{ino}$ which is determined based on a currently selected position (Drive-range position D, Low-range position L, etc.) of an operator-controlled shift lever.

In a power transmitting system of the type indicated above, however, an amount of change in the speed ratio "r" of the CVT is unnecessarily increased, if the CVT and the auxiliary transmission are operated simultaneously, for example, if the CVT is shifted up during a shift-up action of the auxiliary transmission, or if the CVT is shifted down during a shift-down action of the auxiliary transmission. The unnecessarily increased change in the speed ratio "r" of the CVT leads to a reduction in the driving feel or comfort of the operator of the vehicle.

A simultaneous operation of the CVT and the auxiliary transmission will cause another problem, if a single common hydraulic pressure source is used to operate the CVT and the auxiliary transmission. More specifically, simultaneous shifting actions of the CVT and the auxiliary transmission require a concurrent use of a pressurized working fluid in a comparatively large amount, with a result of a drop in the line pressure of the system, and a consequent slip of the transmission belt of the CVT, which may reduce the operating durability of the transmitting system.

SUMMARY OF THE INVENTION

It is therefore an object of the present invention to provide a method and apparatus for controlling a hydraulically-operated power transmitting system including a continuously variable transmission and an auxiliary transmission, which method and apparatus permit ameliorated driving feel and comfort of the vehicle, and/or which assure a minimum drop in hydraulic line pressure of the transmitting system.

According to the present invention, there is provided a method of controlling a hydraulically-operated power transmitting system for an automotive vehicle, the power transmitting system including a continuously variable transmission and an auxiliary transmission coupled to the continuously variable transmission, the auxiliary transmission having plural speed-range positions, the method comprising a step of restraining a shifting operation of the continuously variable transmission while the auxiliary transmission is in a shifting action.

According to the invention, there is also provided an apparatus which is suitably used to practice the method of the invention described above. The apparatus comprises: (1) monitoring means for detecting a shifting action of the auxiliary transmission; and (2) means for restraining a shifting operation of the continuously variable transmission while the shifting action of the auxiliary transmission is detected.

In the method and apparatus of the invention as described above, a shifting operation of the continuously variable transmission is inhibited or at least restrained while the auxiliary transmission is in a shifting action. Accordingly, a change in the speed ratio of the power transmitting system is held relatively small. Namely, the present method and apparatus prevent the continuously variable transmission from being required to change its speed ratio in such an exccessive amount as to cause a considerable reduction in the driving feel of the operator, after the shifting action of the auxiliary transmission has been completed.

Further, the method and apparatus of the invention which restrain or substantially inhibit an operation of the continuously variable transmission during a shifting action of the auxiliary transmission, are effective to prevent a conventionally experienced drop in the line pressure of the system due to an increased amount of consumption of the working fluid for simultaneous activation of the two transmissions, where the two transmissions are operated by a single common hydraulic source. Hence, the instant method and apparatus prevent a slip of the transmission belt of the continuously variable transmission due to such a pressure drop, and are therefore conducive to improvement in the operating durability of the power transmitting system.

According to an advantageous embodiment of the invention, the shifting operation of the continuously variable transmission is restrained when a shift-up action of the auxiliary transmission is started while the continuously variable transmission is in a shift-up operation, or when a shift-down action of the auxiliary transmission is started while the continuously variable transmission is in a shift-down operation. The restraint of the shifting operation of the continuously variable transmission may be effected by reducing a rate of change in the speed ratio of the continuously variable transmission to a predetermined low level, or by substantially inhibiting a shifting operation of the continuously variable transmission, while the auxiliary transmission continues a shifting action.

In an advantageous embodiment of the apparatus of the invention, the continuously variable transmission and the auxiliary transmission are operated under a hydraulic pressure generated by a single common pressure source. According to another advantageous embodiment of the apparatus of the invention, the continuously variable transmission comprises an input shaft, an output shaft, a pair of variable-diameter pulleys provided on the input and output shafts, respectively, a transmission belt connecting the pair of variable-diameter pulleys, and a pair of hydraulic actuators for changing effective diameters of the variable-diameter pulleys which engage the transmission belt.

BRIEF DESCRIPTION OF THE DRAWING

The foregoing and other objects, features and advantages of the present invention will be readily appreciated as the same becomes better understood by reference to the following detailed description, when considered in connection with the accompanying drawing, in which:

FIG. 2 is a view showing a relation between shift positions of an auxiliary transmission and operating states of a frictional coupling assembly of the auxiliary transmission;

DETAILED DESCRIPTION OF THE PREFERRED EMBODIMENT

Referring to the accompanying drawing, a preferred embodiment of the invention will be described.

Figure 1:
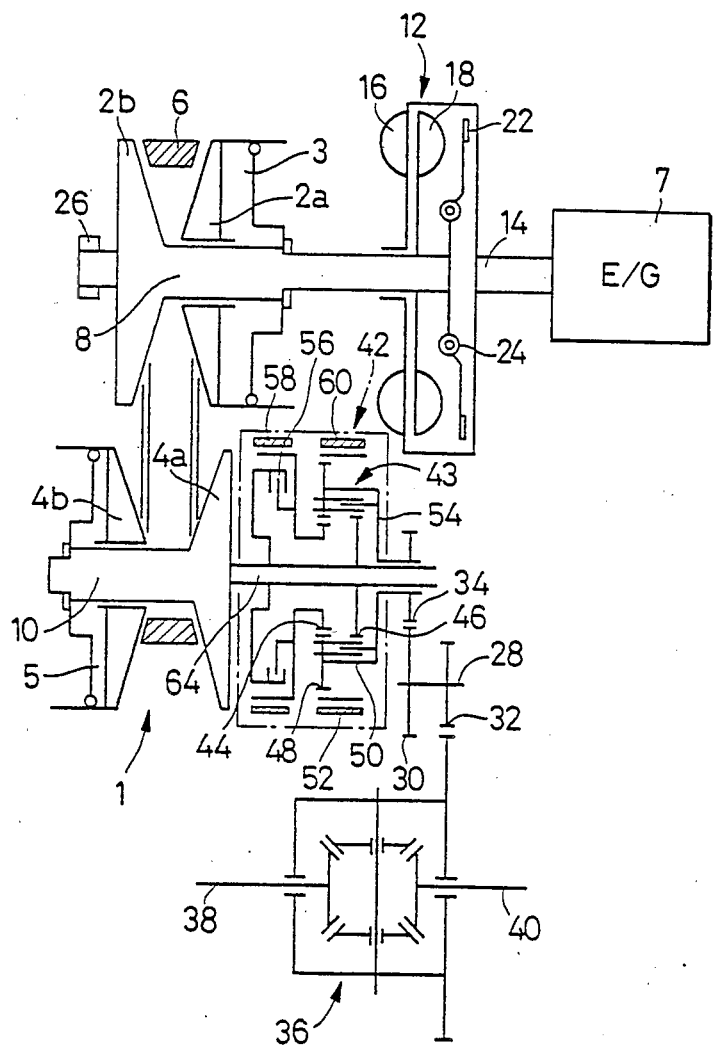
FIG. 1 is a schematic illustration of essential parts of a power transmitting system incorporating a continuously variable transmission.

There is shown in FIG. 1 a continuously variable transmission (hereinafter referred to as "CVT") generally indicated at 1. The CVT 1 includes a pair of input pulley elements 2a, 2b which form a first variable-diameter pulley, a pair of output pulley elements 4a, 4b which form a second variable-diameter pulley, and a transmission belt 6 which connects the input and output pulley elements 2a, 2b and 4a, 4b to transmit power from an engine 7 of an automotive vehicle. The input pulley element 2a is disposed on an input shaft 8 such that the element 2a is movable axially of the input shaft 8 but not rotatably relative to the shaft 8. The other input pulley element 2b is fixed to the input shaft 8. The output pulley element 4a is fixed to an output shaft 10, while the other output pulley element 4b is disposed on the output shaft 10 axially movably but not rotatably with respect to the shaft 10. The input pulley elements 2a, 2b, and the output pulley elements 4a, 4b have opposed surfaces which are tapered such that a distance between the tapered surfaces increases in a radially outward direction. In the meantime, the transmission belt 6 has a trapezoidal cross sectional shape to suit the opposed tapered surfaces of the pully elements 2a, 2b, 4a, 4b. An output pulley cylinder or actuator 5 is provided to move the output pulley element 4b, primarily for changing a tension of the belt 6. The hydraulic pressure to move the output pulley element 4b relative to the output pulley element 4a is controlled to be as low as possible to the extent that the transmission belt 6 may attain power transmission without a slip on the pulleys. In the meantime, an input pulley cylinder or actuator 3 is provided to move the input pulley element 2a, for changing an effective diameter of the first variable-diameter pulley 2a, 2b (a diameter at which the belt 6 engages the pulley). The hydraulic pressure to move the input pulley element 2a relative to the input pulley element 2b primarily determines a speed ratio "r" of the CVT 1 ($N_{in}/N_{out}$=ratio of a rotating speed $N_{in}$ of the input shaft 8 over a rotating speed $N_{out}$ of the output shaft 10). A fluid coupling 12 is provided, which has a pump impeller 16 connected to a crank shaft 14 of the engine 7, and a turbine 18 which is fixed to the input shaft 8 and is rotated by rotation of the pump impeller 16 via a fluid in the coupling 12. In the fluid coupling 12, there is incorporated a direct-coupling lock-up clutch 22 which serves to directly connect the crank shaft 14 to the input shaft 8. The direct-coupling lock-up clutch 22 is provided with dampers 24 which absorb or accommodate a shock upon disengagement of the lock-up clutch 22, and a variation in torque of the engine 7. When the running speed of the vehicle or the operating speed of the engine 7 exceeds a predetermined limit, the lock-up clutch 22 is engaged so as to prevent loss of power due to transmission by the fluid coupling 12. The pump impeller 16 is rotated together with an oil pump 26 (FIG. 3) which delivers a pressurized fluid to the CVT 1, fluid coupling 12, etc., via a hydraulic control device which will be described. In parallel with the output shaft 10, there is disposed a counter shaft 28 to which are fixed two gears 30, 32. The engine power from the output shaft 10 of the CVT 1 is transmitted to a differential gear 36 through a gear 34 disposed coaxially with the output shaft 10, and through the gears 30, 32 on the counter shaft 28. The power transmitted to the differential gear 36 is further transmitted to drive wheels of the vehicle via left and right axles 38, 40. An auxiliary transmission 42 is disposed coaxially with the output shaft 10 of the CVT 1. This auxiliary transmission 42 includes a complex planetary gear set 43 of RAVIGNEAUX type which includes a first and a second sun gear 44, 46, a first planetary gear 48 meshing with the first sun gear 44, a second planetary gear 50 meshing with the second sun gear 46, a ring gear meshing with the first planetary gear, and a planet carrier 54 which rotatably supports the first and second planetary gears 48, 50. The second sun gear 46 is coupled to a shaft 64 which is integral with the output shaft 10 of the CVT 1 and which serves as an input shaft of the auxiliary transmission 42. The carrier 54 is connected to the gear 34. A high-range clutch 56 is applied to connect the first sun gear 44 and the shaft 64, while a low-range brake band 58 is applied to hold the first sun gear 44 stationary. The ring gear 52 is held stationary by a reverse brake band 60. The high-range clutch 56, low-range brake band 58 and reverse brake band 60 are operated by actuators 57, 59 and 61 (FIG. 5), respectively. The high-range clutch 56 and its actuator 57 constitute a high-range frictional coupling unit for establishing a first forward-drive position of the auxiliary transmission 42, while the low-range brake band 58 and its actuator 59 constitute a second frictional coupling unit for establishing a second forward-drive position of the transmission 42. These frictional coupling units, the reverse brake band 60 and its actuator constitute a frictional coupling assembly of the power transmitting system of the vehicle.

FIG. 2 shows operating states of the above elements of the frictional coupling assembly build in the auxiliary transmission 42, and speed reduction ratios, in relation with shift positions of the transmission 42. In the figure, marks "O" indicate the engagement or application of the cluch or band 56, 58, 60, while marks "X" indicate their disengagement or release. Values p1 and p2 are obtained from the following equations:

$$p1 = Zs1/Zr$$

$$p2 = Zs2/Zr$$

where
Zs1: number of teeth of the first sun gear 44,
Zs2: number of teeth of the second sun gear 46,
Zr: number of teeth of the ring gear 52.

Stated more specifically, a low range position of the transmission 42 is established with the first sun gear 44 held stationary by application of the low-range brake band 58. In this low range position, the power transmission by the auxiliary transmission 42 is effected at a reduction ratio of $(1+p1/p2)$. A high range position is established by the engagement of the high-range clutch 56, which causes the planetary gear set 43 to rotate together with the clutch 56. In this high range, the power transmission is effected at a reduction ratio of 1. In a shift position R (Reverse), the reverse brake band 60 is applied to hold the ring gear 52 stationary, whereby the power transmission is effected in the reverse direction at a reduction ratio of $(1-1/p2)$.

Figure 3:
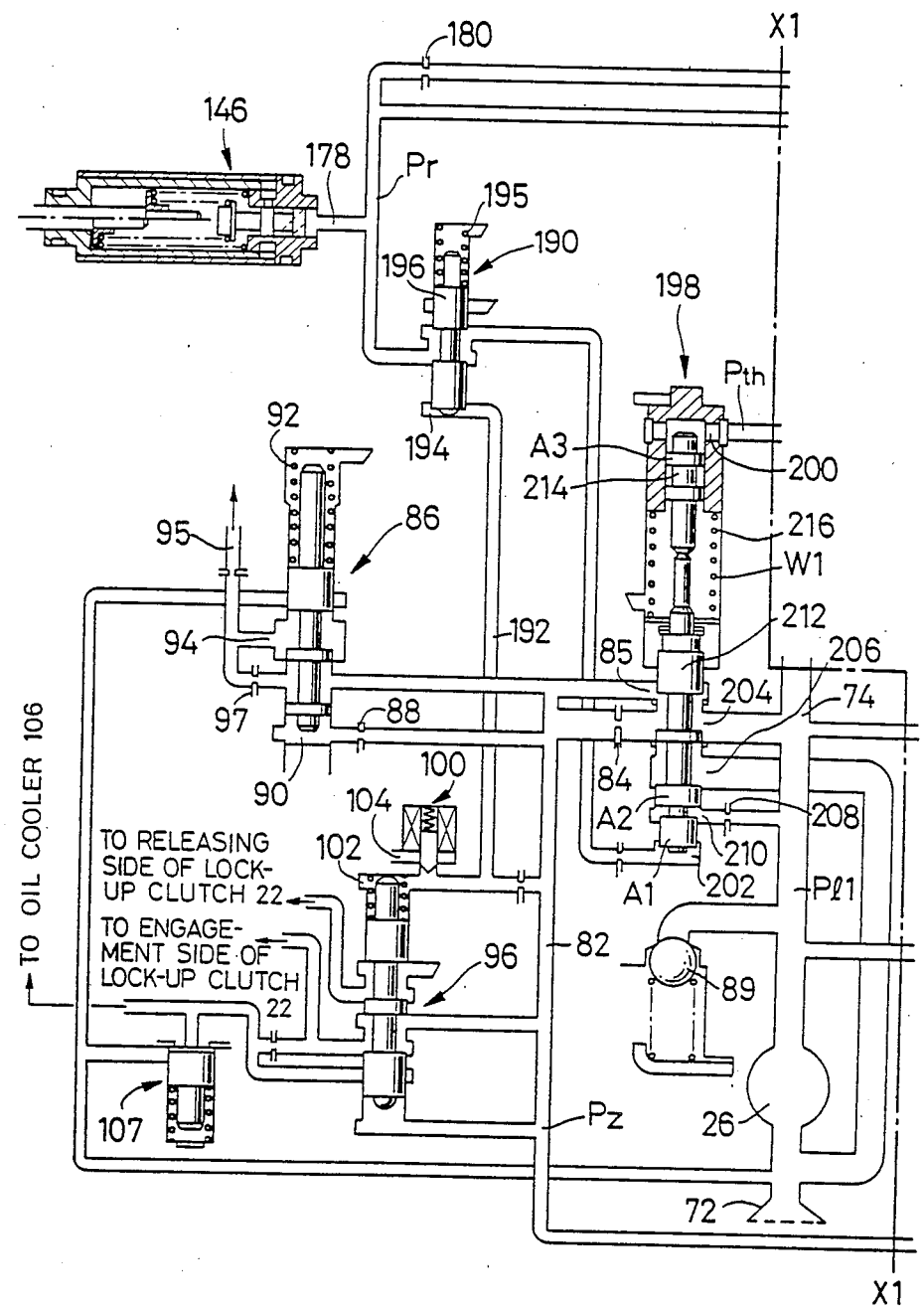
FIGS. 3 through 5 are schematic views of a hydraulic control device for controlling the operations of the continuously variable transmission and the auxiliary transmission of FIG. 1.
Figure 4:
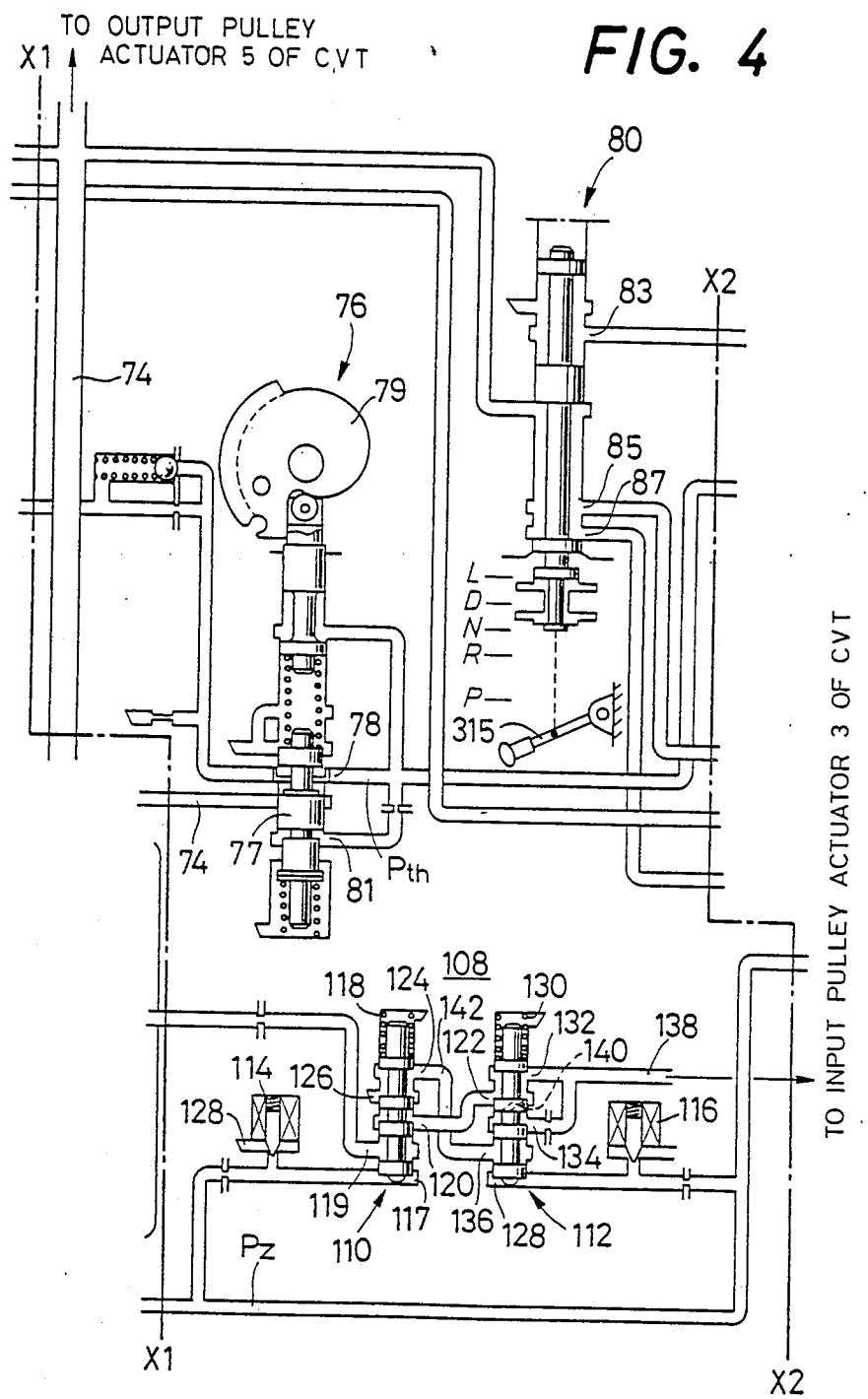
Figure 5:
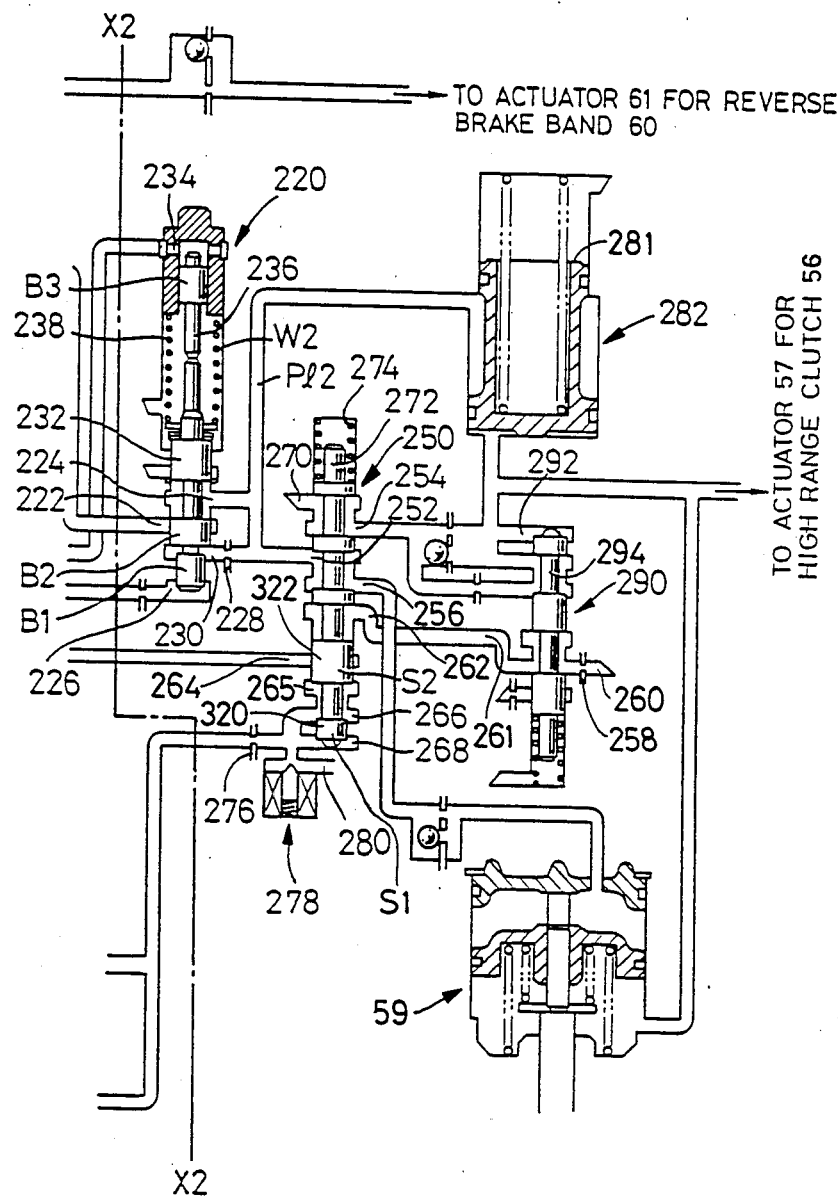

A hydraulic control arrangement is illustrated in FIGS. 3-5, wherein the oil pump 26 sucks up the working fluid through a strainer 72, and delivers the fluid under pressure to a line conduit 74. A throttle valve generally indicated at 76 in FIG. 4 generates at its output port 78 a throttle pressure "Pth" which corresponds to an angle $\theta$ of its opening. In other words, the throttle pressure "Pth" corresponds to an output torque of the engine 7. The throttle valve 76 has a valve spool 77 which receives an operating pressure a throttle cam 79 that increases with the opening angle $\theta$, and the throttle pressure "Pth" from a control port 81 as a feedback pressure. These operating pressure and the feedback pressure act on the valve spool 77 in the opposite directions. Thus, the valve spool 77 controls the communication between the line conduit 74 and the output port 78. There is provided a manual valve 80 having a spool whose axial position is changed according to a selected position of an operator controlled shift lever 315 which has five shift positions L (Low), D (Drive), N (Neutral), R (Reverse) and P (Parking). The manual valve 80 applies a first line pressure Pl1 of the line conduit 74 to a port 83 when the shift position R (Reverse) is selected, and applies the first line pressure Pl1 to a port 85 when the shift position L (Low) is selected. In the shift position D (Drive), the manual valve 80 applies the first line pressure Pl1 to the port 85 and the port 87.

To protect the hydraulic control device, a pressure relief valve 89 is provided adjacent to the oil pump 26, to release the working fluid from the line conduit 74 when the first line pressure Pl1 exceeds a predetermined upper limit.

A secondary pressure conduit 82 is connected to the line conduit 74 through an orifice 84, and through a port 185 of a primary pressure regulator valve 198 through which an excess of the fluid is drained from the valve 198. The secondary pressure conduit 82 is connected through an orifice 88 to a control chamber 90 which is formed in a secondary pressure regulator valve 86. This regulator valve 86 controls the communication between the secondary pressure conduit 82 and a port 94, according to the pressure in the control chamber 90 in relation to a biasing force of a spring 92, so that a secondary pressure Pz in the secondary pressure conduit 82 is maintained at a suitable level. The secondary pressure conduit 82 is connected to a lubrication conduit via the port 94 or an orifice 97. The previously indicated direct-coupling lock-up clutch 22 incorporated in the fluid coupling 12 in parallel is engaged or disengaged under control of a lock-up control valve 96 which applies the secondary pressure Pz in the secondary pressure conduit 82 selectively to one of opposite sides (engagement side or release side) of the lock-up clutch 22. A solenoid valve 100 is provided to control the communication between a control chamber 102 of the lock-up control valve 96 and a drain 104. When the solenoid valve 100 is off (deenergized), the secondary pressure Pz of the secondary pressure conduit 82 is applied to the release side of the lock-up clutch 22, whereby the power from the engine 7 is transmitted to the CVT 1 through the fluid-coupling 12. When the solenoid valve 100 is on (energized), the secondary pressure Pz of the secondary pressure conduit 82 is applied to the engagement side of the lock-up clutch 22 and to the oil cooler 102. In this condition, the engine power is transmitted to the CVT 1 through the lock-up clutch 22. The fluid pressure in an oil cooler 106 is adjusted by a cooler by-pass valve 107.

A speed-ratio control valve assembly is indicated generally at 108 in FIG. 4, which includes a first spool valve 110, a second spool valve 112, a first solenoid valve 114, and a second solenoid valve 116. While the first solenoid valve 114 is off, the spool of the first spool valve 110 is moved toward a spring 118 by the secondary pressure Pz in a control chamber 117. In this condition, the first line pressure Pl1 at a port 119 is applied to a port 122 of the second spool valve 112 via a port 120 of the first spool valve 110, and a port 124 is not in communication with a drain 126. While the second solenoid valve 114 is on, the spool of the first spool valve 110 is pushed toward the chamber 117 by the spring 118. In this condition, the line pressure is not applied to the port 120, and the port 124 is brought into communication with the drain 126. While the second solenoid valve 116 is off, the spool of the second spool valve 112 is pushed toward a spring 130 by the secondary pressure Pz in a control chamber 128. In this condition, the port 122 is not in communication with a port 132, and a port 134 is in communication with a port 136.

The ports 132 and 134 are held in communication with the input pulley actuator 3 of the CVT 1 through a line 138. While the second solenoid valve 116 is on, the spool of the second spool valve 112 is moved toward the chamber 128 by the spring 130. In this condition, the ports 122 and 132 communicate with each other while the ports 134 and 136 are not in communication. The port 136 is connected with the port 124 through a line 142. An orifice 140 is provided in the second spool valve 112 to permit a small flow of the fluid from the port 122 to the port 132 while the second solenoid valve 116 is off. In the above arrangement, therefore, the fluid is supplied to the actuator 3 of the CVT 1 at a high rate while the first solenoid valve 114 is off and the second solenoid valve 116 is on, whereby the speed ratio "r" of the CVT 1 is decreased relatively rapidly. While the first and second solenoid valves 114 and 116 are both off, the supply of the fluid to the actuator 3 is accomplished through the orifice 140, and consequently the speed ratio "r" is decreased slowly. While the first and second solenoid valves 114 and 116 are both on, the actuator 3 of the CVT 1 is not supplied with the pressurized fluid, whereby the speed ratio "r" of the CVT 1 is held constant. While the first solenoid valve 114 is on and the second solenoid valve 116 is off, the fluid in the actuator 3 is discharged through the drain 126, and the speed ratio "r" of the CVT 1 is rapidly increased.

Figure 6:
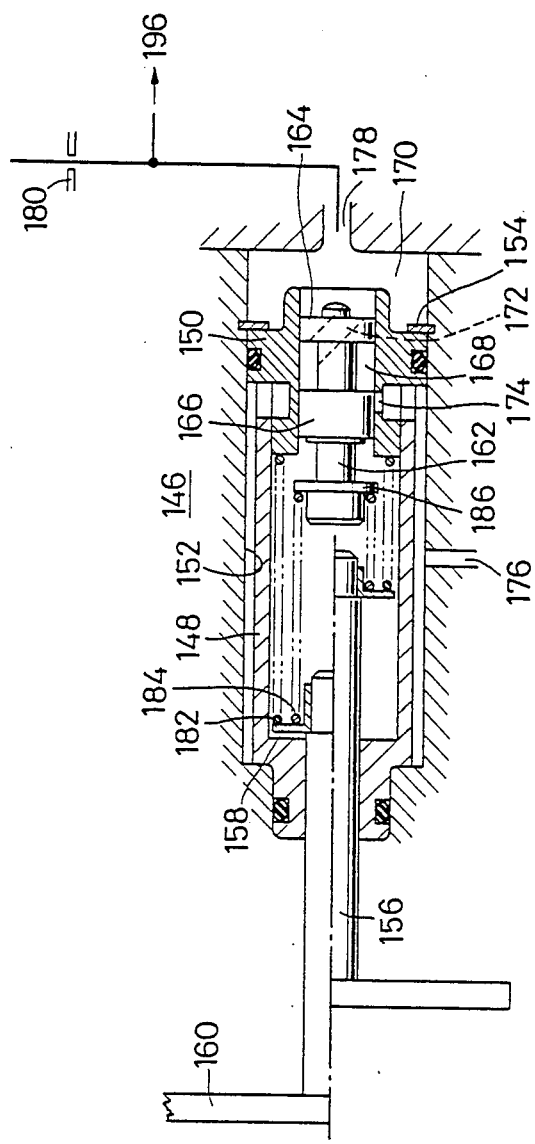
FIG. 6 is a view illustrating a speed-ratio sensing valve.
Figure 7:
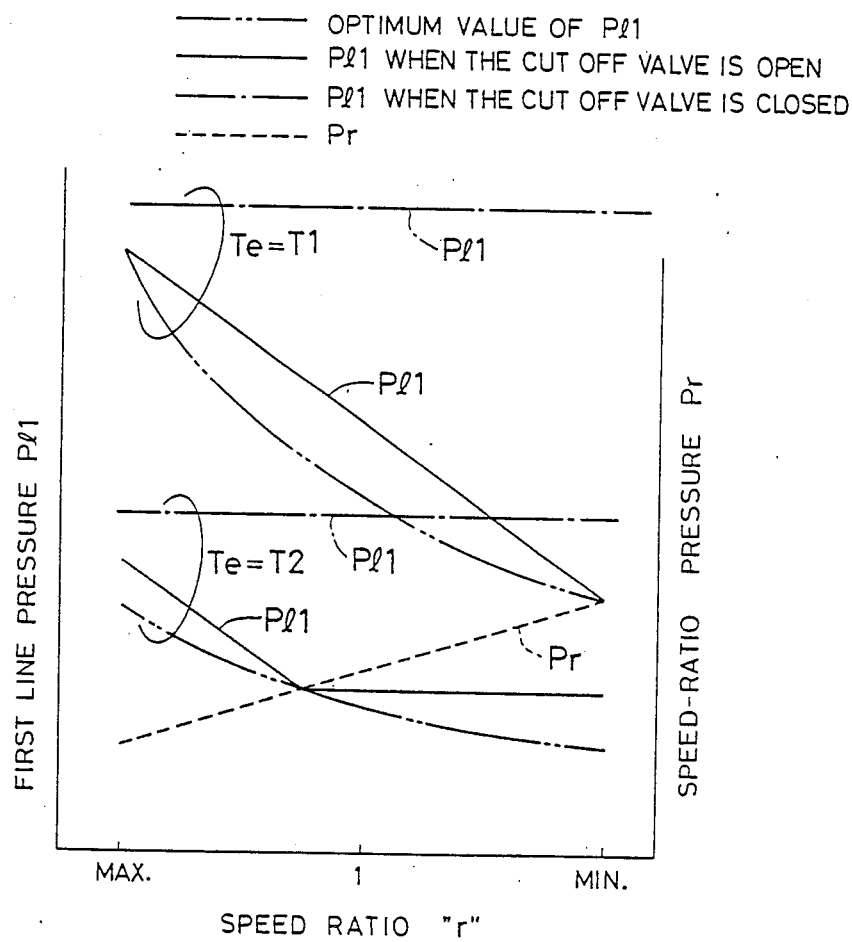
FIGS. 7 and 8 are graphical representations indicating characteristics of a first line pressure used to operate the continuously variable transmission.
Figure 8:
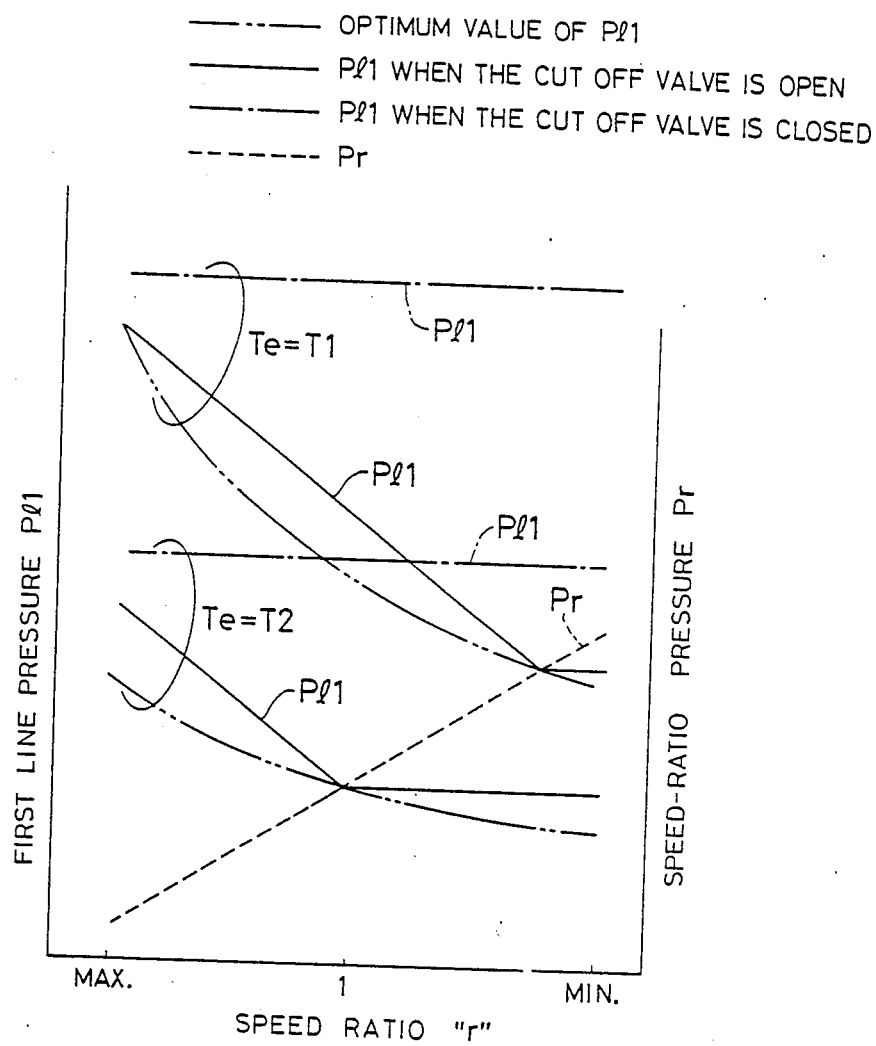

A speed-ratio sensing valve 146 is illustrated in detail in FIG. 6, wherein sleeves 148 and 150 are disposed coaxially within a bore 152, and retained in the axial direction by a retaining ring 154. A rod 156 extends through an end portion of the sleeve 148 and is retained by a spring seat 158. Another rod 160 is secured at its one end to the rod 156, and is held at its other end in engagement with the input pulley element 2a so that the element 2a is rotatable relative to the rod 160. The rod 160 moves the rod 156 in the axial direction by a distance equal to an amount of axial displacement of the input pulley element 2a. A spool 162 having lands 164 and 166 is axially slidably fitted in the sleeve 150. The spool 162 has a passage 172 which communicates with an annular space between the two lands 164, 166, and with an oil chamber 170. The land 166 controls an amount of opening of a port 174 with respect to the annular space 168. The port 174 communicates with a drain 176 via an annular space between the outer surface of the sleeve 148 and the inner surface of the bore 152. The oil chamber 170 is formed with an output port 178 from which a speed ratio pressure Pr is produced. The output port 178 communicates with the line conduit 74 via an orifice 180. A spring 182 is interposed between the spring seat 158 and the sleeve 150, to bias the rod 156 in a direction away from the sleeve 148. In the meantime, a spring 184 is interposed between the spring seat 158 and a flange 186 of the spool 162, in order to bias the spool 162 in a direction toward the oil chamber 170. The speed ratio "r" of the CVT 1 is increased as the distance of the movable input pulley element 2a relative to the stationary input pulley element 2b is increased. Since the rod 156 is moved outward from the sleeve 148 as the movable input pulley element 2a is moved away from the stationary input pulley element 2b, the force of the spring 184 biasing the spool 162 toward the oil chamber 170 is reduced. As a result, the spool 162 is moved toward the rod 156, and the land 166 increases the area of opening of the port 174, whereby the speed-ratio pressure Pr from the output port 178 is decreased. The speed-ratio pressure Pr is established by controlling the amount of fluid discharge from the output port 178. Accordingly, the speed-ratio pressure Pr is held not higher than the line pressure Pl1. Dashed lines in FIGS. 7 and 8 represent two different relations between the speed-ratio pressure Pr and the speed ratio "r". As described later, the first line pressure Pl1 is decreased as the speed ratio "r" is reduced. After the speed ratio "r" has fallen down to a speed ratio "r1" (which varies as a function of the throttle pressure Pth, i.e., as a function of the engine torque Te) at which the speed-ratio pressure Pr is equal to the first line pressure Pl1, the speed-ratio pressure Pr is equal to the first line pressure Pl1. Two-dot chain lines in FIGS. 7 and 8 indicate an optimum value of the first line pressure Pl1, wherein T1 is greater than T2.

A cut-off valve 190 includes a chamber 194 which communicates with the control chamber 102 of the lock-up control valve 96 via a line 192, and further includes a spool 196 which is moved based on the pressure in the chamber 194 and a biasing force of a spring 195. While the solenoid valve 100 is off, that is, while the lock-up clutch 22 is released (for absorbing a shock of the transmission system when the auxiliary transmission 42 is shifted), the cut-off valve 190 is placed in its closed position to prevent the speed-ratio pressure Pr from being applied to the primary pressure regulator valve 198.

The primary pressure regulator valve 198, which serves as first pressure-generating means, has: a port 200 to which the throttle pressure Pth is applied; a port 202 to which the speed-ratio pressure Pr is applied; a port 204 connected to the line conduit 74; a port 206 connected to a suction side of the oil pump 26; a port 210 to which the first line pressure Pl1 is applied via an orifice 208; a spool 212 which is axially movable to control the communication between the ports 204 and 206; a spool 214 which receives the throttle pressure Pth and biases the spool 212 toward the port 202; and a spring 216 which biases the spool 212 toward the port 202.

While the cut-off valve 190 is open and the speed-ratio pressure Pr is applied to the port 202, the following equation is established:

$$Pl1 = (A3 \cdot Pth + W1 - A1 \cdot Pr)/(A2 - A1) \tag{1}$$

where,
A1: cross sectional area of the lowermost land of the spool 212,
A2: cross sectional area of the land next to the lowermost land of the spool 212,
A3: cross sectional area of the land of the spool 214 receiving the throttle pressure Pth,
W1: biasing force of the spring 216.

While the cut-off valve 190 is closed and the speed-ratio pressure Pr is not applied to the port 202, the following equation is established:

$$Pl1 = (A3 \cdot Pth + W1)/(A2 - A1) \tag{2}$$

The pressures Pl1 defined by the above two equations are indicated by solid and one-dot chain lines, in FIGS. 7 and 8, respectively.

A sub-primary pressure regulator valve 220, which serves as second pressure-generating means, has: an input port 222 to which is applied the first line pressure Pl1 from the port 85 of the manual valve 80 while the shift position L or D is selected; an output port 224 from which a second line pressure Pl2 is generated; a port 226 to which the speed-ratio pressure Pr is applied; a port 230 to which is applied through an orifice 228 the second line pressure Pl2 which serves as a feedback pressure; a spool 232 which controls the communication between the input and output ports 222 and 224; a port 234 to which the throttle pressure Pth is applied; a spool 236 which receives the throttle pressure Pth and biases the spool 232 toward the port 226; and a spring 238 which biases the spool 232 toward the port 226. In this sub-primary pressure regulator valve 220, the following equation is established:

$$Pl2 = (B3 \cdot Pth + W2 - B1 \cdot Pr)/(B2 - B1) \quad (3)$$

where,

B1: cross sectional area of the lowermost land of the spool 232,

B2: cross sectional area of the land next to the lowermost land of the spool 232, B3: cross sectional area of the land of the spool 236 receiving the throttle pressure Pth, W2: biasing force of the spring 238.

Figure 9:
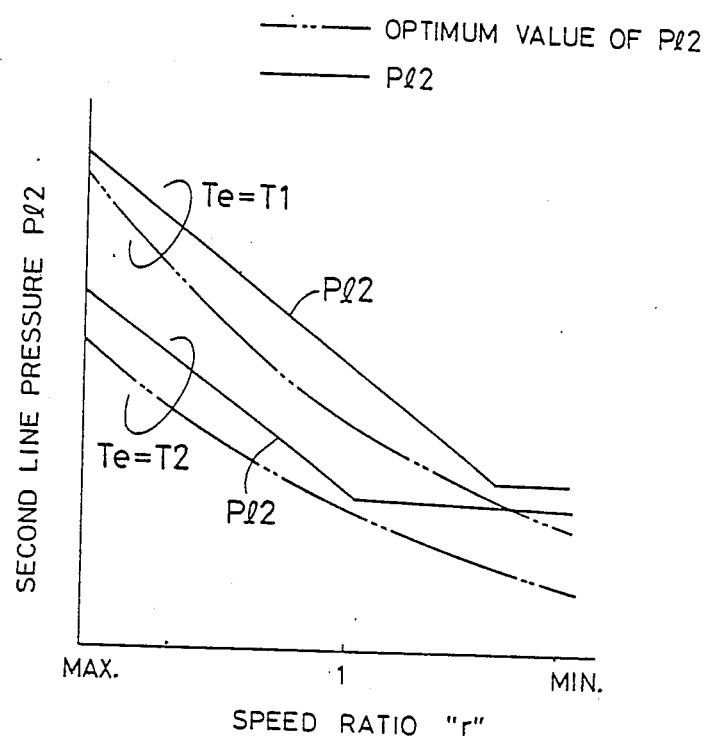
FIG. 9 is a graphical representation indicating characteristics of a second line pressure used to operate the auxiliary transmission.

FIG. 9 indicates a relation between the second line pressure Pl2 generated by the sub-primary pressure regulator valve 220, and its ideal value.

A shift valve 250 has: a port 252 to which is applied the second line pressure Pl2 while the shift position D or L is selected; a port 262 connected to a drain conduit 261 which has an orifice 258 and terminates in a drain 260; a control port 264 to which is applied the first line pressure Pl1 from the port 87 of the manual valve 80 when the shift position D is selected; a control chamber 265; other control ports 266, 268; a drain 270; a spool 272; and a spring 274 biasing the spool 272 toward the port 268. The spool 272 has a first land 320 (as counted from the bottom of the spool) having a pressure-receiving area S1 (transverse cross sectional area), and a second land 322 (as counted from the bottom of the spool) having a pressure-receiving area S2 (transverse cross sectional area) which is greater than the pressure-receiving surface S1 of the first land 320. The control port 264 is disposed relative to the first and second lands 320, 322 of the spool 272 so that the control port 264 is located between the first and second lands 320, 322 while the spool 272 is located in its high-range position on the side of the spring 272. In this high-range position, the control port 264 is held in communication with the control chamber 265. Namely, the control chamber 265 is adapted to communicate selectively with the control port 264 or with the control port 266, according to the position of the spool 272, as described later in detail. The secondary pressure Pz is applied to the control ports 266, 268 via an orifice 276, and the pressure at the control ports 266, 268 is regulated by a solenoid valve 278. The solenoid valve 278 is turned on and off in relation to driving parameters of an automotive vehicle. While the solenoid valve 278 is on, the fluid is discharged from a drain 280.

When the spool 272 is located in the high-range position (on the side of the spring 274), the input port 252 is in communication with the output port 254, and the output port 256 is in communication with the drain 260 via the port 262 and the orifice 258. Accordingly, the second line pressure Pl2 is delivered from the output port 254 to an accumulator 282, and to an actuator 57 of the high-range clutch 56, whereby the auxiliary transmission 42 is placed in the high-range position.

When the spool 272 is located in its low-range position (on side of the port 268, the input and output ports 252, 256 communicate with each other, and the output port 254 is in communication with the drain 270. Consequently, the second line pressure Pl2 from the output port 256 is delivered to an actuator 59 of the low-range brake band 58, whereby the auxiliary transmission 42 is placed in the low-range position.

While the shift position L is selected, the first line pressure Pl1 is not applied to the control port 264. Therefore, when the solenoid valve 278 is turned off, the spool 272 is moved toward the spring 274 initially by the secondary pressure Pz acting on the second land 322 land with the pressure-receiving area S2, and subsequently by the secondary pressure Pz acting on the first land 320 with the pressure-receiving area S1. When the solenoid valve 278 is turned on, the pressure at the control ports 272, 268 is decreased and the spool 272 is moved by the spring 274 toward the port 268. In the shift position L, therefore, the auxiliary transmission 42 may be switched between its high-range and low-range positions according to the on-off states of the solenoid valve 278.

In the shift position D, the first line pressure Pl1 is applied to the control port 264. Consequently, once the spool 272 has been located in the high-range position, the control chamber 265 is disconnected from the control port 266, but connected to the control port 264. Therefore, the first line pressure Pl1 from the control port 264 acts on the pressure-receiving areas S1 and S2 of the first and second lands 320, 322 of the spool 272. As a result, the spool 272 is biased toward the spring 274 with a force of $[(S2-S1) Pl1 + S1 \cdot Pz]$. Since the biasing force of the spring 274 is selected to be smaller than the above force $[(S2-S1) Pl1 + S1 \cdot Pz]$, the spool 272 is subsequently held located in the high-range position (on the side of the 274), irrespective of the subsequent on-off state of the solenoid valve 272. Thus, the auxiliary transmission 42 is held in its high-range postion.

A shift-timing valve 290 has: a control port 292 communicating with the actuator 57 of the high-range clutch 56, and further has a spool 294 whose axial position is controlled by the pressure at the control port 292. With movements of the spool 294, an amount of flow of the fluid into the actuator 57 of the high-range clutch 56 and an amount of the fluid flow from the actuator 59 of the low-range brake band 58, are controlled when the auxiliary transmission is shifted up with the shift valve 250 switched from the low-range position to the high-range position.

The secondary pressure Pz from the secondary pressure conduit 82 is applied to the solenoid valves 100, 114, 116 and 278, and serve to release the secondary pressure Pz as required. In a hydraulic control device disclosed in Japanese patent application No. 59-12017 previously indicated, however, the throttle pressure Pth is applied to solenoid valves. In this case, therefore, the biasing force of a spring and the force generated by a solenoid coil must be determined so as to cope with the maximum throttle pressure. Accordingly, the solenoid valve must be relatively large-sized, and the response characteristics of a spool of a spool valve associated with the solenoid valve are degraded when the throttle pressure is relatively low. Further, the spring force acting on the spool is difficult to set. In the illustrated embodiment wherein the secondary pressure Pz is used for the solenoid valves, the above-indicated disadvantages are eliminated, and the freedom of designing of the device is improved.

Figure 10:
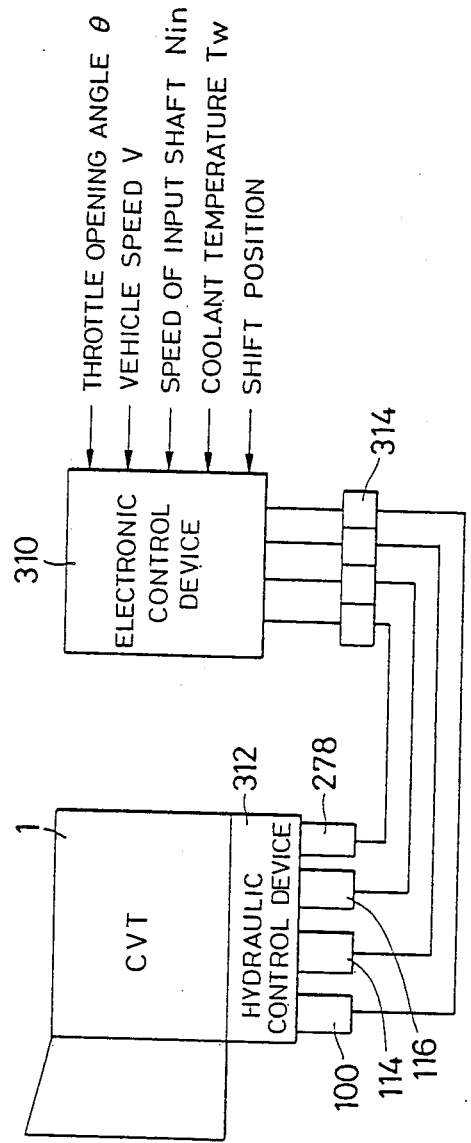
FIG. 10 is a schematic diagram showing a general control arrangement for controlling the power transmitting system.

FIG. 10 is a schematic block diagram showing a general control arrangement for controlling the power transmitting system which has been described hitherto. The control arrangement includes an electronic control device 310 which receives input signals indicative of various parameters such as throttle opening angle $\theta$, running speed V of the vehicle, rotating speed $N_{in}$ of the input shaft 8 of the CVT 1, temperature Tw of coolant for the engine and selected shift position. The electronic control device 310 controls the solenoid valves 100, 114, 116 and 278 through amplifier stage 314. The control device 310 is constituted by a microcomputer comprising a central processing unit, a read-only memory, and a random-access memory.

Figure 11:
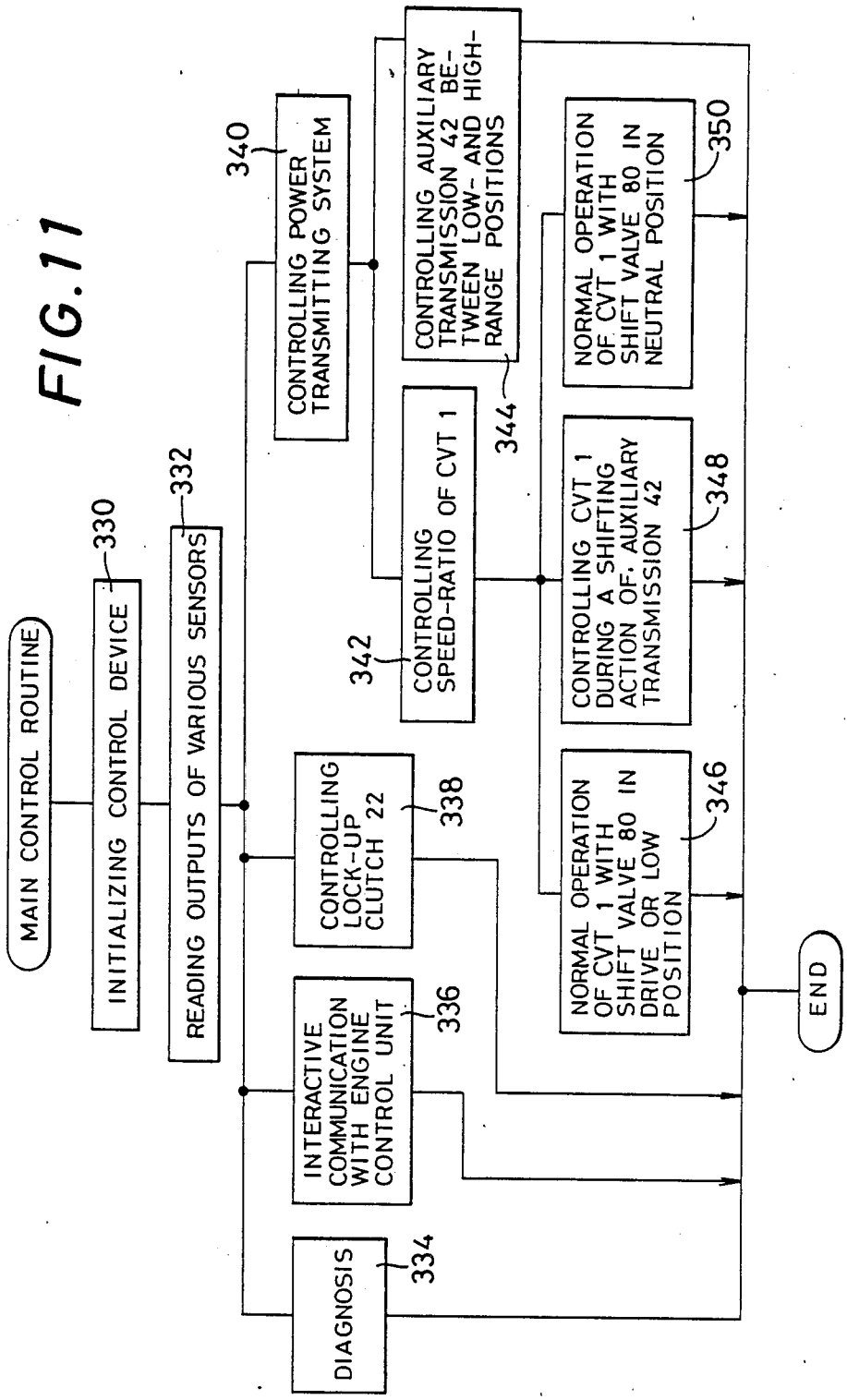
FIG. 11 is a block diagram showing a main routine of the control arrangement for controlling the power transmitting system.

FIG. 11 shows a main control routine of the control device 310 for controlling the power transmitting system. Initially, the control device 310 is initialized (step 330). Then, the control device 310 receives outputs of the various sensors (step 332). Successively, the control device selectively executes one of the following steps: step 334 wherein the various elements of the power transmitting system are checked or diagnosed for normal functioning; step 336 wherein the control device 310 interacts with a control device which controls an amount of fuel injection, an ignition timing and other operations of the engine 7; step 338 wherein the direct-coupling lock-up clutch 22 is controlled; and step 340 wherein the power transmitting system including the CVT 1 and the auxiliary transmission 42 is controlled. The control operation in step 340 includes step 342 in which the speed ratio "r" of the CVT 1 is controlled, and step 344 in which the auxiliary transmission 42 is controlled so as to be switched between its low-range and high-range positions. The control operation in step 342 includes: step 346 in which the speed ratio "r" of the CVT 1 is controlled in a normal manner with the manual shift valve 80 placed in the shift position D (Drive) or L (Low), so that the actual rotating speed $N_{in}$ of the input shaft 8 of the CVT 1 coincides with a determined target speed $N_{ino}$ of the input shaft 8; step 348 for controlling the CVT 1 after a shifting action of the auxiliary transmission 42 has been started; and step 350 wherein when the manual shift valve 80 is shifted to the shift position N (Neutral) while the vehicle is running, the speed ratio "r" of the CVT 1 is controlled so as to permit a smooth shift when the manual shift valve 80 is subsequently placed in the shift position D or L. The present invention relates to step 342, particularly to step 348, and more particularly to an operation to control the CVT 1 after a shifting action of the auxiliary transmission 42 has been started.

Figure 12:
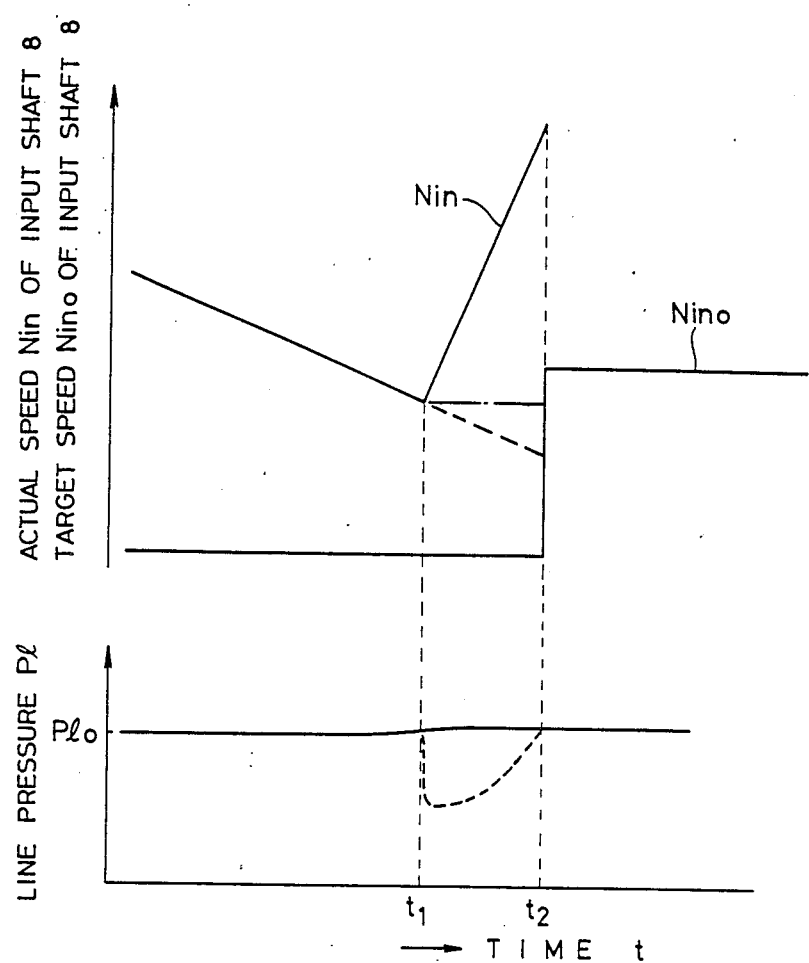
FIG. 12 is a graphical representation for explaining the control principle according to the invention.

Referring to FIG. 12, there is illustrated the control principle according to the invention, where the auxiliary transmission 42 is shifted down from the high-range position to the low-range position while the CVT 1 is operated to decrease the speed ratio "r" (while the CVT 1 is shifted up). As previously described, a change in the speed ratio "r" of the CVT 1 is effected by means of a flow of the hydraulic fluid into or out of the input pulley actuator 3. For example, the fluid should be fed into the actuator 3 when the CVT 1 is shifted up. Obviously, a total amount of the fluid which is effectively used in the power transmitting system is increased if the auxiliary transmission 42 is shifted (e.g., shifted down) while the CVT 1 is shifted up. In FIG. 12, the auxiliary transmission 42 starts a shift-down action at a point of time t1, and completes the shift-down action at a point of time t2. Since a target speed $N_{ino}$ of the input shaft 8 (hereinafter referred to as "target input speed $N_{ino}$") with the auxiliary transmission 42 placed in the high-range position is determined to be lower than the input target speed $N_{ino}$ with the auxiliary transmission 42 placed in the low-range position, the target input speed $N_{ino}$ is instantaneously increased at t2. In the graph showing the actual input speed $N_{in}$ of the input shaft 8, a dashed line represents a change (decrease) of the input speed $N_{in}$ if the shift-up operation of the CVT 1 continues without a shift-down action of the auxiliary transmission 42 taking place during the shift-up operation of the CVT 1. A one-dot chain line indicates the input speed $N_{in}$ after the shift-up operation of the CVT 1 is stopped at T1 without an shift-down action of the auxiliary transmission 42. A solid line represents the input speed $N_{in}$ where the shift-up operation of the CVT 1 is stopped (according to the principle of the invention) if the shift-down action of the auxiliary transmission 42 is started at t1. In a conventional hydraulic control device, the shift-up operation of the CVT 1 is continued even after the auxiliary transmission 42 starts a shifting action, and consequently a comparatively large amount of the hydraulic working fluid is necessary to actuate the friction coupling units of the auxiliary transmission 42 and the input pulley actuator 3 of the CVT. As a result, the line pressure Pl suddenly drops immediately after t1, as indicated in dotted line, and is held at a comparatively low level during the shift-down operation of the auxiliary transmission 42. This reduced line pressure may lead to a slip of the transmission belt 6 of the CVT 1, thereby reducing the durability of the power transmission system. In the present embodiment of the invention, however, the shift-up operation of the CVT 1 is stopped during the shifting action of the auxiliary transmission 42. The stop of the shift-up operation of the CVT 1 eliminates a corresponding amount of the fluid otherwise fed into the input pulley actuator 3, whereby the line pressure Pl may be kept at an optimum level Plo while the auxiliary transmission is being shifted.

While the above description referring to FIG. 12 relates to a control operation where the CVT 1 is shifted up, it will be understood that a shift-down operation of the CVT 1 is also stopped during a shifting action of the auxiliary transmission 42 according to the present invention, because the shift-down operation of the CVT 1 requires a flow of the fluid into the output pulley actuator 5.

Figure 13:
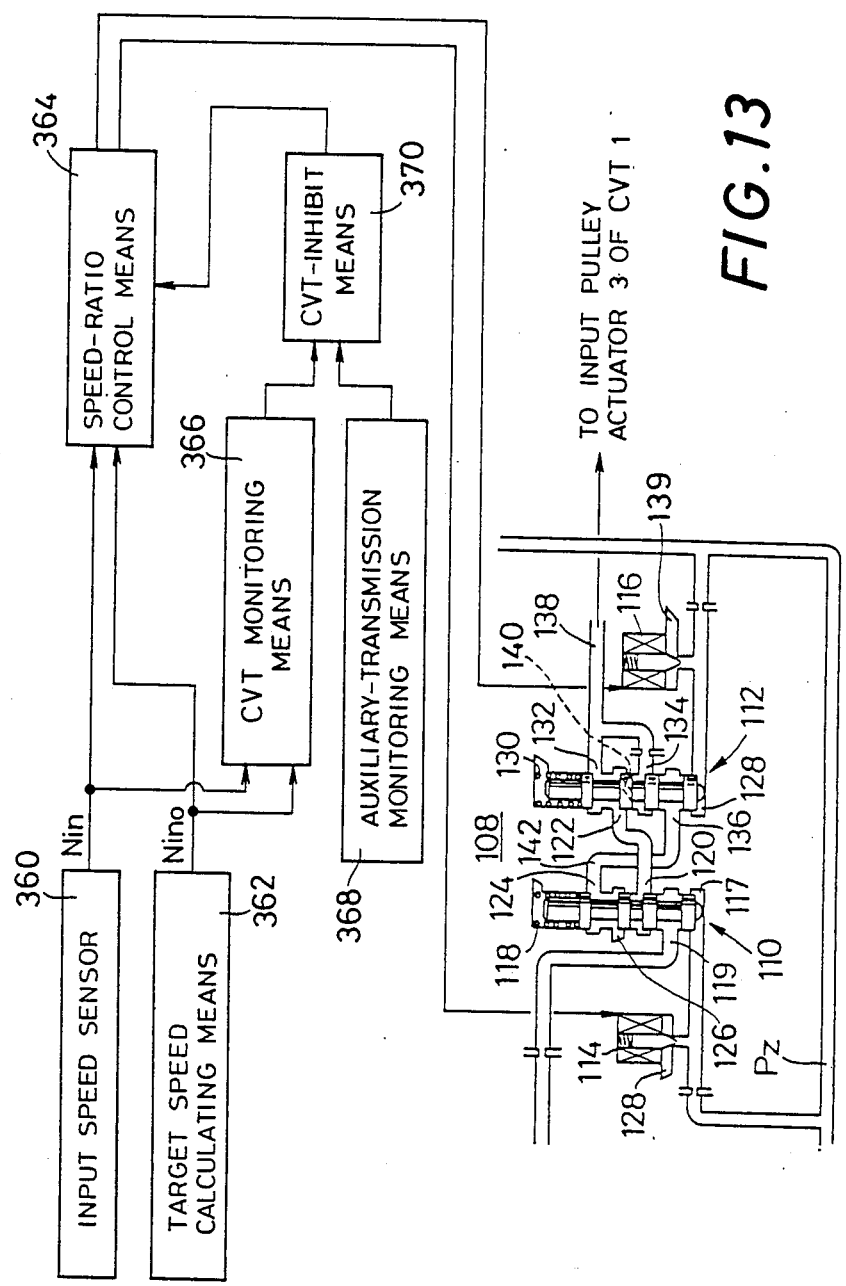
FIG. 13 is a view showing an arrangement of essential elements of one embodiment of a hydraulic control apparatus of the invention.

FIG. 13 shows an arrangement of essential elements of one embodiment of a hydraulic control apparatus of the invention, wherein an input speed sensor 360 detects the actual input speed $N_{in}$ of the input shaft 8 of the CVT 1, while target speed calculating means 362 determines the target input speed $N_{ino}$ of the input shaft 8 based on the opening angle $\theta$ of the throttle valve of the engine 7. Outputs $N_{in}$ and $N_{ino}$ of the input speed sensor 360 and the target speed calculating means 362 are fed to speed-ratio control means 364. Based on a difference between the inputs $N_{in}$ and $N_{ino}$, the speed-ratio control means 364 produces control signals to control the first and second solenoid valves 114 and 116, to adjust the speed ratio "r" of the CVT 1 so that the actual input speed $N_{in}$ coincides with the target input speed $N_{ino}$. Like the speed-ratio control means 364, CVT monitoring means 366 receives the outputs $N_{in}$ and $N_{ino}$ of the input speed sensor 360 and the target speed calculating means 362, and checks to see if the CVT 1 is in a shifting action or not, based on a difference between the two inputs $N_{in}$ and $N_{ino}$. Auxiliary-transmission monitoring means 368 checks to see if the auxiliary transmission 42 is in a shifting action or not. Outputs of the monitoring means 366, 368 are fed to CVT-INHIBIT means 370 which detects a shifting action of the auxiliary transmission 42 during a shifting operation of the CVT 1, and feeds the speed-ratio control means 364 with a CVT-INHIBIT signal, thereby causing the speed-ratio control means 364 to inhibit the shifting operation of the CVT 1. While the CVT-INHIBIT signal is present, the speed-ratio control means 364 holds both of the first and second solenoid valves 114, 116 in the ON positions (energized), whereby flows of the fluid into and from the input pulley actuator 3 of the CVT 1 are stopped. Thus, the shifting operation of the CVT 1 is stopped while the auxiliary transmission 42 is in a shifting action.

The control device 310 comprises the above-described target speed calculating means 362, speed-ratio control means 364, CVT monitoring means 366, auxiliary-transmission monitoring means 368 and CVT-INHIBIT means 370.

Figure 14:
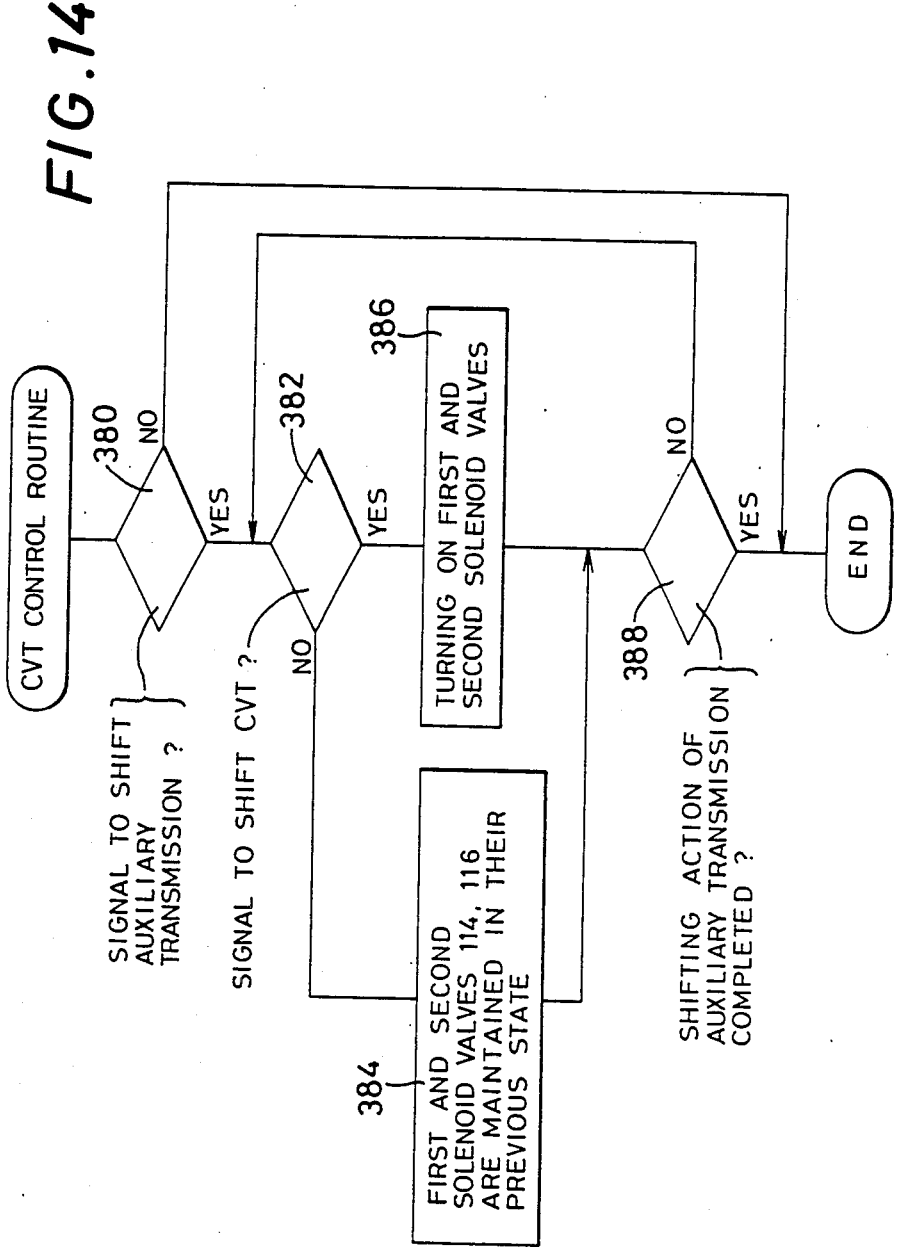
FIG. 14 is a flow chart illustrating a routine for controlling the continuously variable transmission while the auxiliary transmission is in a shifting action.

Referring to a flow chart of FIG. 14, there is shown a CVT control routine for controlling the CVT 1 while the auxiliary transmission 42 is in a shifting action. Initially, the control device 310 checks if a signal to shift the auxiliary transmission 42 is present or not (step 380). The subsequent steps will be executed only when the signal is present, that is, only when a shifting action of the auxiliary transmission 42 has been started. If the signal is present, the control device 310 goes to step 382 to check if a signal to shift the CVT 1 is present or not. If the signal is not present, that is, while the CVT 1 is not in a shifting action, the first and second solenoid valves 114, 116 are maintained in their previous state. If the CVT 1 is in a shifting action, the first and second solenoid valves 114 and 116 are both turned on (step 386), to stop the shifting action of the CVT 1. Subsequently, the control device 310 checks to see if the shifting action of the auxiliary transmission 42 has been completed or not (step 388). Steps 382 and 384, or steps 382 and 386 are repeatedly executed until the shifting action of the auxiliary transmission 42 has been completed.

In the present embodiment which has been described hitherto, an operation of the CVT 1 is stopped during a shifting action of the auxiliary transmission 42. Therefore, the present embodiment is effective to prevent a conventionally experienced drop in the line pressure of the power transmitting system due to an increased amount of consumption of the working fluid for simultaneous activation of the two transmissions 1 and 42, where the two transmissions are operated by a hydraulic pressure generated by the single oil pump 26. Hence, the instant embodiment makes it possible to avoid a slip of the transmission belt 6 of the CVT 1 due to such a pressure drop, whereby the operating durability of the power transmitting system is improved. While the present embodiment is adapted to completely stop a shifting operation of the CVT 1 during a shifting action of the auxiliary transmission 42, the principle of the invention may be practiced by restraining the shifting operation of the CVT 1, i.e., by effecting the shifting operation at a very slow rate, rather than completely stopping the shifting action.

Referring to FIGS. 15-20, a modified embodiment of the invention will be described. In this modified embodiment, the CVT 1 is controlled by a control arrangement of FIG. 19 according to a flow chart of FIG. 20. The same reference numerals as used in the preceding embodiment are given to identify the corresponding elements.

Figure 15:
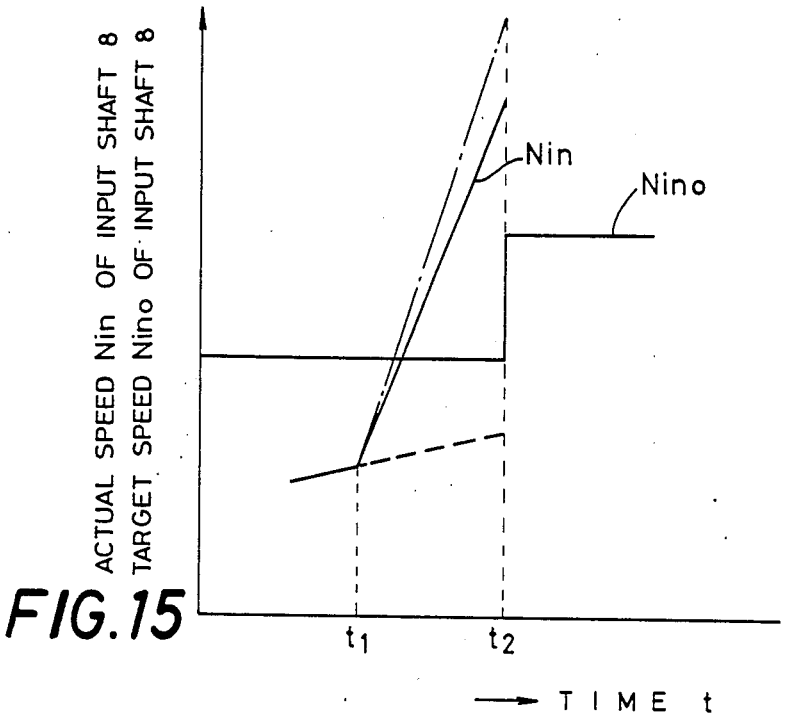
FIGS. 15 through 18 are graphs for explaining the control principle according to a modified embodiment of the invention.
Figure 16:
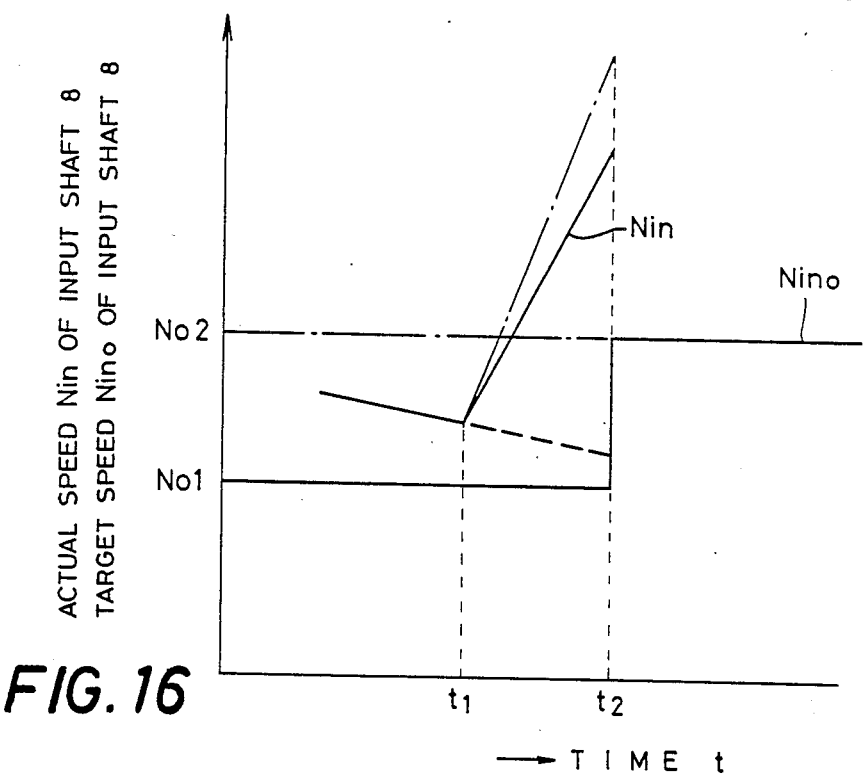
Figure 17:
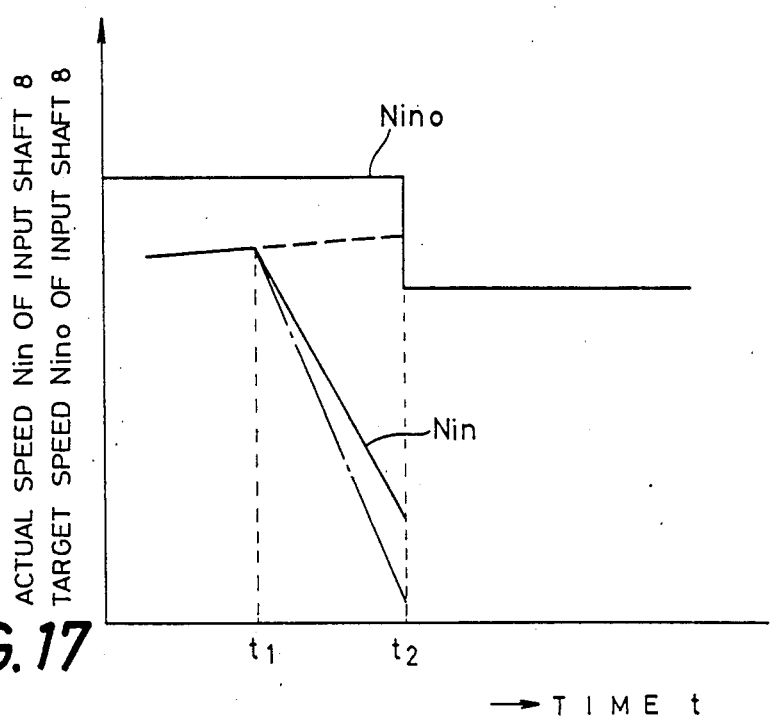
Figure 18:
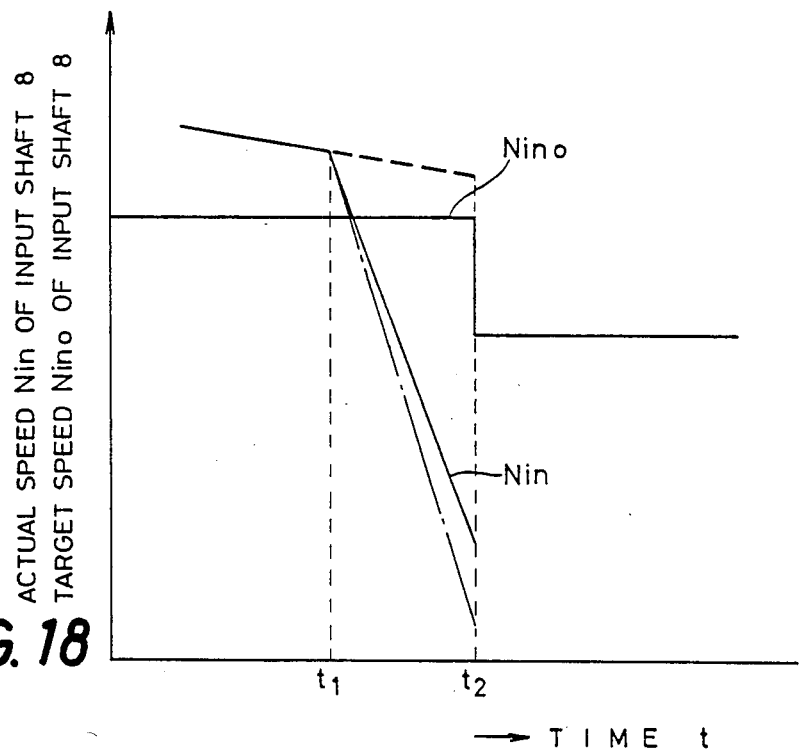

FIGS. 15-18 are views showing the control principle according to the present embodiment. In the figures, a shifting action of the auxiliary transmission 42 is started at t1, and completed at t2. As previously discussed, the target input speed $N_{ino}$ of the input shaft 8 with the auxiliary transmission 42 placed in the high-range position is determined to be lower than the input target speed $N_{in}$ with the auxiliary transmission 42 placed in the low-range position, the target input speed $N_{ino}$ is instantaneously increased at t2. In the graphs showing the actual input speed $N_{in}$ of the input shaft 8, a dashed line represents a change (increase) of the input speed $N_{in}$ if the shifting operation of the CVT 1 continues without a shifting action of the auxiliary transmission 42 taking place during the shifting operation of the CVT 1. FIG. 15 shows a case (a) wherein the auxiliary transmission 42 is shifted down while the CVT is shifted down. FIG. 16 shows a case (b) wherein the auxiliary transmission 42 is shifted down while the CVT 1 is shifted up. FIG. 17 shows a case (c) wherein the auxiliary transmission 42 is shifted up while the CVT 1 is shifted down. FIG. 18 shows a case (d) wherein the auxiliary transmission 42 is shifted up while the CVT 1 is shifted up. In the cases (a) and (d) of FIGS. 15 and 18, the shift-down or shift-up action of the CVT 1 is stopped or inhibited during the shift-down or shift-up action of the auxiliary transmission 42, respectively, that is, during a time interval between t1 and t2. In the cases (b) and (c) of FIGS. 16 and 17, the shift-up or shift-down action of the CVT 1 is continued even while the auxiliary transmission 42 is in the shift-down or shift-up action, respectively. In FIGS. 15 and 18, one-dot chain line indicates a change of the actual speed $N_{in}$ of the input shaft 8 if the shift-up or shift-down action of the CVT 1 is continued even after the shift-down or shift-up action of the auxiliary transmission 42 has been started. In FIGS. 16 and 17, one-dot chain line indicates a change of the actual input speed $N_{in}$ if the shift-up or shift-down action of the CVT 1 is stopped or inhibited during the shifting action of the auxiliary transmission 42. If the CVT 1 is controlled as shown in the one-dot chain lines, an amount of change in the speed ratio of the power transmitting system is increased while the auxiliary transmission 42 is in a shifting action. As a result, there exists a comparatively large difference between the actual input speed $N_{in}$ and the target input speed $N_{ino}$, at the point of time t2, i.e., at the end of the shifting action of the auxiliary transmission 42. Therefore, the speed ratio "r" of the CVT 1 should be changed in a comparatively large degree after the point of time t2. In the instant embodiment, however, the CVT 1 is controlled as indicated in solid lines. Consequently, a change in the speed ratio of the power transmitting system is restrained, and a difference between the speeds $N_{in}$ and $N_{out}$ at the point of time t2 is reduced. Hence, a required change in the speed ratio "r" of the CVT 1 after the point of time t2 can be reduced. While the present embodiment is adapted to inhibit or stop the shift-down or shift-up operation of the CVT in the cases (a) and (d) of FIGS. 15 and 18, it is possible to continue the shift-down or shift-up operation of the CVT 1 at a very low rate, respectively, or alternatively to effect a shift-up or shift-down operation of the CVT 1 (actuate the CVT 1 in the reverse direction) in order to further reduce an amount of change in the speed ratio of the power transmitting system.

Figure 19:
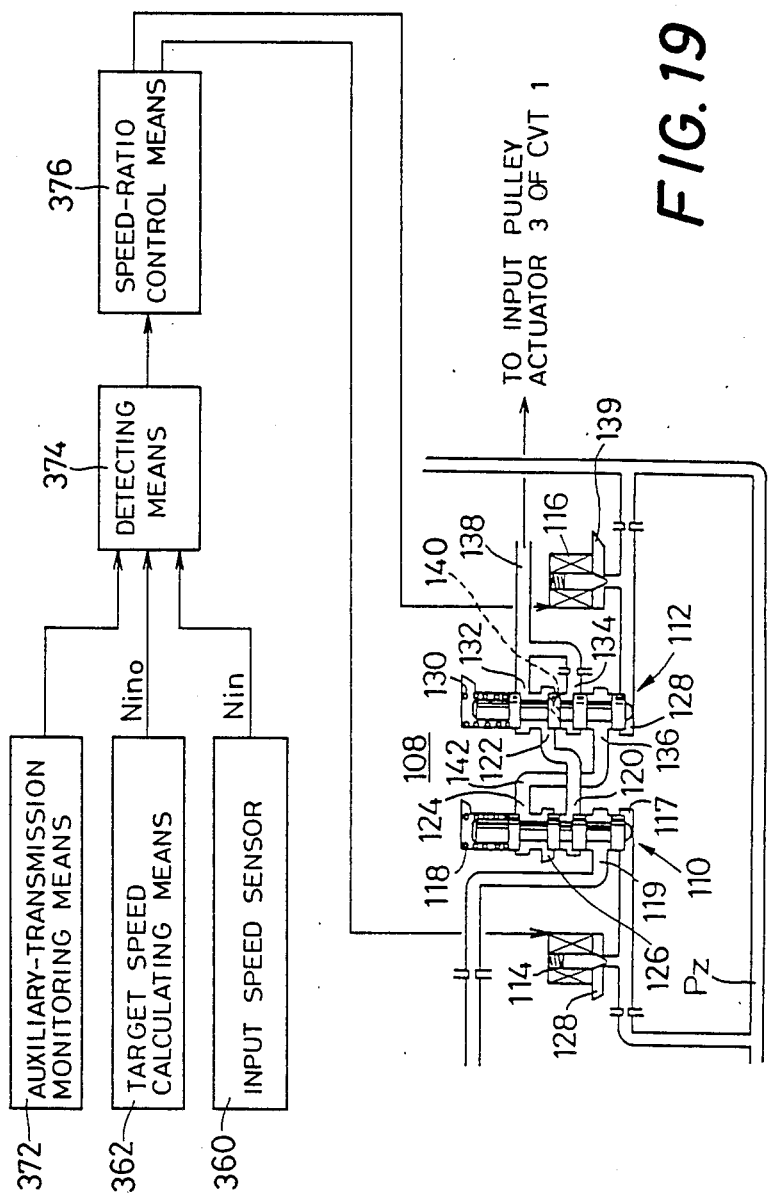
FIG. 19 is a view showing an arrangement of essential elements of a hydraulic control apparatus of the modified embodiment.

The arrangement of essential control elements of the present modified embodiment is shown in FIG. 19 wherein auxiliary-transmission monitoring means 372 detects a shift-up or shift-down action of the auxiliary transmission 42, and the input speed sensor 360 detects the current speed $N_{in}$ of the input shaft 8. The target speed calculating means 362 calculates the target input speed $N_{ino}$ of the input shaft 8, based on the opening angle $\theta$ of the throttle valve. When the actual input speed $N_{in}$ is lower than the target input speed $N_{ino}$, the CVT 1 is shifted down. When the actual input speed $N_{in}$ is higher than the target input speed $N_{ino}$, the CVT 1 is shifted up. Outputs of the monitoring means 372, calculating means 362 and sensor 360 are applied as inputs to detecting means 374. Based on these inputs, the detecting means 374 detects: (a) a shift-down action of the auxiliary transmission 42 during a shift-down operation of the CVT 1; (b) a shift-down action of the auxiliary transmission 42 during a shift-up operation of the CVT 1; (c) a shift-up action of the auxiliary transmission 42 during a shift-down operation of the CVT 1; and (d) a shift-up action of the auxiliary transmission 42 during a shift-up operation of the CVT 1. A signal indicating the detected one of the four different cases (a)–(d) of a shifting action of the auxiliary transmission 42 is generated from the detecting means 374 and applied to speed-ratio control means (solenoid valve control means) 376. According to the received signal from the detecting means 374, the speed-ratio control means controls the first and second solenoid valves 114, 116. In the case (a), the first and second solenoid valves 114 and 116 are both turned off, so that the fluid is fed, at a very low rate through the orifice 140, into the input pulley actuator 3, whereby the CVT 1 is shifted up at a very low rate (at such a low rate that the shift-down operation of the CVT 1 is considered almost stopped). In the case (b), the first and second solenoid valves 114, 116 are controlled in the normal manner, as in a condition where the auxiliary transmission 42 is not in a shifting action. That is, the shift-up operation of the CVT 1 is continued. In the case (c), the solenoid valves 114, 116 are controlled in the normal manner, so that the shift-down operation of the CVT 1 is continued. In the case (d), the first and second solenoid valves 114, 116 are both turned on, whereby the CVT 1 is shifted down at a very low rate (at such a low rate that the shift-down operation of the CVT 1 is almost stopped).

The control device 310 in the present modified embodiment comprises the above-described target speed calculating means 362, auxiliary-transmission monitoring means 372, detecting means 374 and speed-ratio control means 376.

Figure 20:
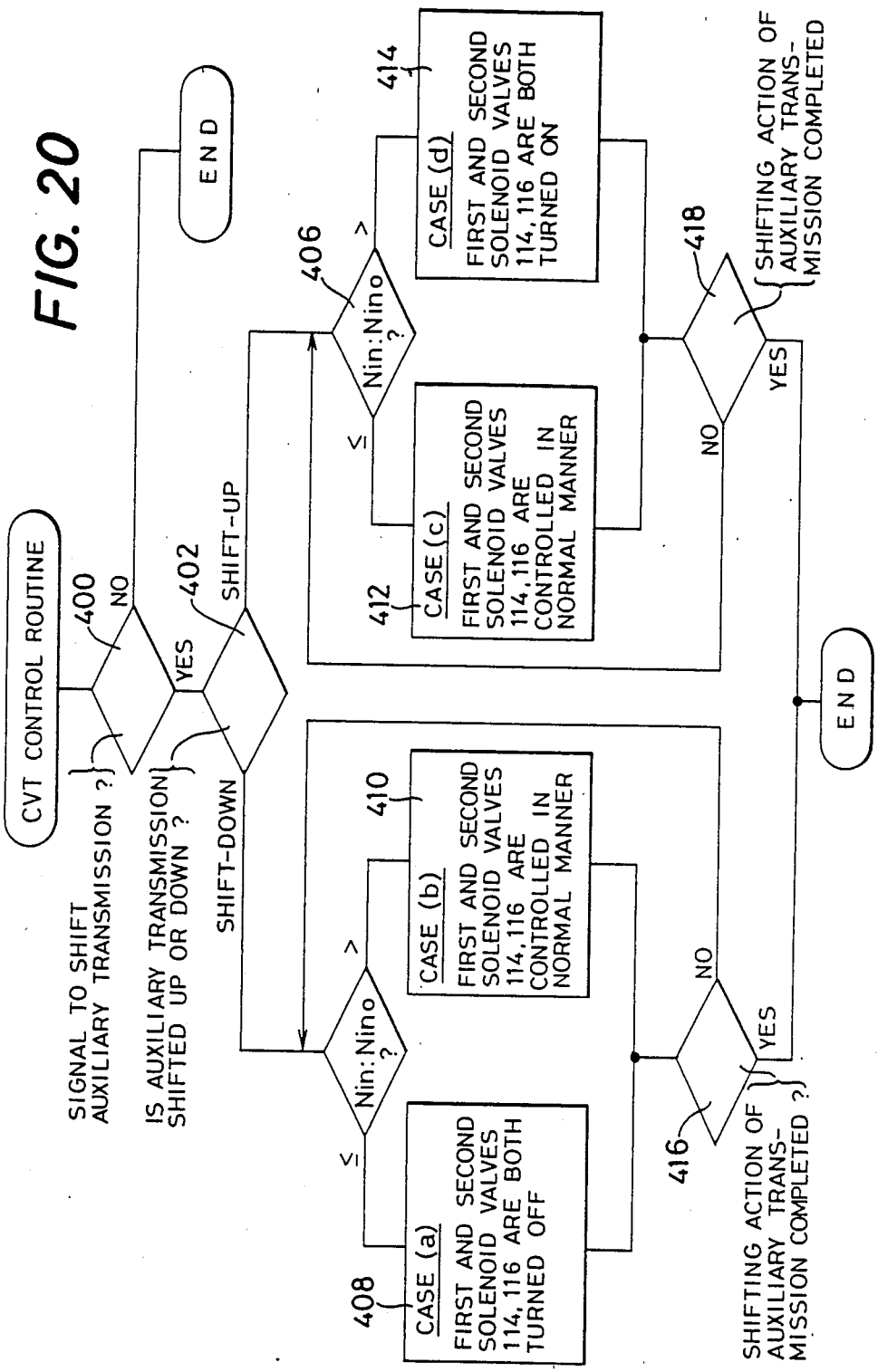
FIG. 20 is a flow chart illustrating a routine for controlling the continuously variable transmission according to the modified embodiment, while the auxiliary transmission is in a shifting action.

Referring to FIG. 20, there is shown a flow chart indicating a CVT control routine, which corresponds to the routine of FIG. 14 in the preceding embodiment. In the flow chart of FIG. 20, the control device 310 initially checks if a signal to shift the auxiliary transmission 42 is present or not (step 400). The subsequent steps will be executed only when the signal to shift the transmission 42 is present. Namely, if the signal is present, the control device 310 judges whether the auxiliary transmission 42 is shifted down or shifted up (step 402). Then, the control device 310 (detecting means 374) compares the actual input speed $N_{in}$ with the target input speed $N_{ino}$ (steps 404 and 406). Thus, one of the previously indicated four cases (a), (b), (c) and (d) is detected. According to the detected one of the cases (a)–(d), steps 408, 410, 412 and 414 are selectively executed to control the first and second solenoid valves 114, 116, as previously described by reference to FIG. 19. Subsequently, step 416 or 418 is executed to check if the shifting action of the auxiliary transmission 42 has been completed. Steps 404 and 408, steps 404 and 410, steps 406 and 412 or steps 406 and 414 are repeatedly executed until the result of checking in step 416 or 418 becomes affirmative.

In the modified embodiment which has been described a shifting operation of the CVT 1 is inhibited or at least restrained while the auxiliary transmission 42 is in a shifting action. Accordingly, a change in the speed ratio of the power transmitting system is held relatively small. That is, the present embodiment is effective to prevent the CVT 1 from being required to change its speed ratio "r" in such an excessive amount as to cause a considerable reduction in the driving feel of the operator, after the shifting action of the auxiliary transmission 42 has been completed.

While the present invention has been described in its preferred embodiments with a certain degree of particularity, it is to be understood that the invention is not confined to the details of the illustrated embodiments, but may be embodied with various changes, modifications and improvements which may occur to those skilled in the art.

What is claimed is:

1. A method of controlling a hydraulically-operated power transmitting system for an automotive vehicle, the power transmitting system including a continuously variable transmission and an auxiliary transmission coupled to the continuously variable transmission, the auxiliary transmission having a plurality of speed-range positions, said method comprising the steps of:

controlling a speed ratio of said continuously variable transmission and selectively placing said auxiliary transmission in one of said plurality of speed-range positions, according to varying parameters of the vehicle;

detecting simultaneous operations of said continuously variable transmission and said auxiliary transmission, which consist of a shift-down action of said auxiliary transmission during a shift-down operation of said continuously variable transmission, and a shift-up action of said auxiliary transmission during a shift-up operation of said continuously variable transmission; and upon detection of said simultaneous operations, restraining a change in said speed ratio of said continuously variable transmission while said auxiliary transmission is in said shift-down action or said shift-up action.

2. A method according to claim 1, wherein said step of restraining a change in said speed ratio comprises substantially stopping the shifting operation of said continuously variable transmission while said auxiliary transmission is in said shift-down or shift-up action.

3. A method according to claim 1, wherein said step of restraining a change in said speed ratio comprises reducing a rate of change in said speed ratio of said continuously variable transmission to a predetermined low level when said simultaneous operations of said continuously variable transmission and said auxiliary transmission are detected.

4. An apparatus for controlling a hydraulically-operated power transmitting system for an automotive vehicle, the power transmitting system including a continuously variable transmission and an auxiliary transmission coupled to the continuously variable transmission, the auxiliary transmission having a plurality of speed-range positions, said apparatus comprising:
- means for controlling a speed ratio of said continuously variable transmission and selectively placing said auxiliary transmission in one of said plurality of speed-range positions, according to varying parameters of the vehicle;
- detecting means for detecting simultaneous operations of said continuously variable transmission and said auxiliary transmission, which consist of a shift-down action of said auxiliary transmission during a shift-down action operation of said continuously variable transmission, and a shift-up action of said auxiliary transmission during a shift-up operation of said continuously variable transmission; and
- means for restraining, upon detection of said simultaneous operations, a change in said speed ratio of said continuously variable transmission while said simultaneous operations of the continuously variable transmission and the auxiliary transmission are detected.

5. An apparatus according to claim 4, wherein said restraining means comprises means for substantially stopping the shifting operation of said continuously variable transmission while said auxiliary transmission is in said shift-down or shift-up action.

6. An apparatus according to claim 4, wherein said restraining means comprises means for reducing a rate of change in said speed ratio of said continuously variable transmission to a predetermined low level when said simultaneous operations of said continuously variable transmission and said auxiliary transmission are detected.

7. An apparatus for controlling a hydraulically operated power transmitting system for an automotive vehicle, the power transmitting system including a continuously variable transmission of a belt-and-pulley type, and an auxiliary transmission coupled to the continuously variable transmission, said continuously variable transmission comprising an input shaft, an output shaft, a pair of variable-diameter pulleys provided on said input and output shafts, respectively, a transmission belt connecting said pair of variable-diameter pulleys, and a pair of hydraulic actuators for changing effective diameters of said pulleys which engage the transmission belt, said auxiliary transmission having a plurality of speed-range positions, said apparatus comprising:
- a single common pressure source for operating said continuously variable transmission and said auxiliary transmission;
- means for selectively placing said auxiliary transmission in said plurality of speed-range positions;
- speed-ratio control means for controlling a speed ratio of said continuously variable transmission;
- monitoring means for detecting a shifting action of said auxiliary transmission during a shifting operation of said continuously variable transmission; and
- means for substantially inhibiting, upon detection of said shifting action, said shifting operation of said continuously variable transmission by said speed-ratio control means, until said shifting action of said auxiliary transmission has been completed.

8. An apparatus according to claim 7, further comprising means for determining a target speed of said input shaft of the continuously variable transmission based at least on a currently required output of an engine of the vehicle, and a sensor for detecting an actual speed of said input shaft, wherein said speed-ratio control means controls said pair of hydraulic actuators of said continuously variable transmission such that the detected actual speed coincides with the determined target speed.

9. An apparatus according to claim 8, wherein said monitoring means comprises means for detecting the shifting operation of said continuously variable transmission based on a difference between said detected actual speed and said determined target speed of said input shaft.

10. A method of controlling a hydraulically-operated power transmitting system for an automotive vehicle, including a continuously variable transmission of a belt-and-pulley type, and an auxiliary transmission coupled to the continuously variable transmission, said continuously variable transmission comprising an input shaft, an output shaft, a pair of variable-diameter pulleys provided on said input and output shafts, respectively, a transmission belt connecting said pair of variable-diameter pulleys, and a pair of hydraulic actuators for changing effective diameters of said pulleys which engage the transmission belt, said method comprising the steps of:
- using a single common pressure source for operating said continuously variable transmission and said auxiliary transmission;
- operating said continuously variable transmission and said auxiliary transmission according to varying parameters of the vehicle;
- detecting a start of a shifting action of said auxiliary transmission during a shifting operation of said continuously variable transmission; and
- upon detection of said start, substantially inhibiting said shifting operation of said continuously variable transmission until said shifting action of said auxiliary transmission has been completed.

11. A method according to claim 10, wherein said step of operating said continuously variable transmission comprises determining a target speed of said input shaft of the continuously variable transmission based at least on a currently required output of an engine of the vehicle, detecting an actual speed of said input shaft, and controlling said pair of hydraulic actuators of said continuously variable transmission such that the detected actual speed coincides with the determined target speed.

12. A method according to claim 10, wherein said step of detecting a start of a shifting action of said auxiliary transmission during a shifting operation of said continuously variable transmission comprises detecting the shifting operation of said continuously variable transmission based on a difference between said detected actual speed and said determined target speed of said input shaft.

* * * * *